United States Patent [19]
Baucke et al.

[11] Patent Number: 5,094,927
[45] Date of Patent: Mar. 10, 1992

[54] HYDROGEN/OXYGEN FUEL CELL

[75] Inventors: Friedrich G. K. Baucke, Mainz; Stefan Dorner, Pforzheim; Volker Heinzel, Linkenheim-Hochstetten; Gernot Röth, Dalheim b. Mainz, all of Fed. Rep. of Germany

[73] Assignee: Kernforschungszentrum Karlsruhe GmbH, Karlsruhe, Fed. Rep. of Germany

[21] Appl. No.: 578,505

[22] Filed: Sep. 6, 1990

[30] Foreign Application Priority Data

Sep. 7, 1989 [DE] Fed. Rep. of Germany ....... 3929730

[51] Int. Cl.⁵ ............................................. H01M 8/10
[52] U.S. Cl. ........................................ 429/33; 429/40
[58] Field of Search .................. 429/33, 40, 41, 42, 429/30, 31, 32

[56] References Cited

U.S. PATENT DOCUMENTS 4,985,315 1/1991 Lemoine .................. 429/33

Primary Examiner—Anthony Skapars

[57] ABSTRACT

A hydrogen/oxygen fuel cell includes an electrolyte which is solid at room temperature, has opposing faces, conducts protons, and is comprised of at least one of (a) at least one oxide of at least one element selected from the group consisting of Group IVB, VB, VIB, and VIII elements of the Periodic Table, (b) silicon dioxide, and (c) at least one fluoride of at least one element selected from the group consisting of Group IIA and IIIB elements of the Periodic Table. Also included are a hydrogen electrode which is applied to one face of the opposing faces of the electrolyte, is hydrogen permeable, and is negatively charged in use; and an oxygen electrode which is applied to another face of the opposing faces of the electrolyte, is hydrogen permeable, and is positively charged in use. A hydrogen-containing gas chamber is provided so as to be in communication with the hydrogen electrode; and an oxygen-containing gas chamber is provided so as to be in communication with the oxygen electrode.

7 Claims, 2 Drawing Sheets

HYDROGEN/OXYGEN FUEL CELL

CROSS-REFERENCE TO RELATED APPLICATION

This application claims the priority of Application Ser. No. P 39 29 730.6-45 filed Sept. 7th, 1989, 1 in the Federal Republic of Germany.

BACKGROUND OF THE INVENTION

1. Field of the Invention.

The present invention relates to a hydrogen/oxygen fuel cell including a proton-conducting electrolyte which is solid at room temperature and onto opposing sides of which are applied a hydrogen electrode, which is negatively charged in use, is hydrogen permeable, and is in communication with a hydrogen-containing gas chamber, and an oxygen electrode, which is positively charged in use, is hydrogen permeable, and is in communication with an oxygen-containing gas chamber.

2. Background of the Related Art.

Such hydrogen/oxygen fuel cells are described in an article entitled "Assessment of Research Needs for Advanced Fuel Cells," published in an international journal *ENERGY*, Penner, S.S., (Ed.), Volume 11, No. 1/2, January/February, 1986, pages 137–152 (Special Issue).

This publication indicates that organic polytetrafluoroethylenes, for example, the product known under the trademark Nafion ®, have been employed as proton-conducting, solid electrolytes. The drawback of such solid electrolytes, however, is inherent in the materials themselves and is the fact that fuel cell operating temperatures must be limited to values below 100° C. Even if the fuel gases are supplied under increased pressure, for example, 7 bar, the operating temperature can be raised only slightly above 100° C. Although a solid electrolyte should be able to withstand a brief temperature increase to 200° C., there exists, in principle, the danger at these temperatures of an irreversible change in the organic polyterafluoroethylene materials.

For future fuel cells, inorganic heteropolyacids of molybdenum and tungsten have been proposed as solid electrolytes. Heteropolyacids, however, have a defined water of crystallization content and, at higher temperatures, the water of crystallization may easily be driven off and change the physical characteristics of the material. Moreover, such solid electrolytes require uniform wetting since, otherwise, non-uniform current loads and temperatures occur which lead to cracks and so-called "hot spots". "Hot spot" as used herein refers to a location in an electrolyte at which the reaction gases have direct access to one another and react chemically with one another while developing heat exclusively.

According to the aforementioned *ENERGY* article, sintered nickel and alloys of the noble metals platinum and palladium have been employed as electrode materials. In addition to pure oxygen and hydrogen, air and forming gas have been employed as fuel gases.

Volume I entitled "Brennstoffzelle" ["Fuel Cell"] of the book *dtv-Lexikon der Physik* [*Pocket Encyclopedia of Physics*], published by Deutscher Taschenbuchverlag (1970), pages 300–307, and a publication by Rudolf Weber entitled "Der sauberste Brennstoff" ["The Cleanest Fuel"], published by Olynthus Verla fur verstandliche Wissenschaft und Technik, Oberbdzberg, Switzerland (1988), page 74, indicate that porous electrodes having open pores of a diameter of about 1 $\mu$m must be employed for fuel cells. However, such pores may easily be filled with water formed during the reaction of the hydrogen and oxygen fuel gases. According to the first-mentioned publication, therefore, the porous electrodes are coated with a hydrophobic layer, such as a Nafion ® or a polytetrafluoroethylene layer. This material, as discussed in the foregoing, has inherent temperature limitations.

Porous electrodes have the additional disadvantage that separation of hydrogen-containing gases and oxygen-containing gases from one another may be endangered if the electrolyte ceases to be a physical barrier, for example, due to the formation of cracks.

A basic problem in prior art fuel cells operating at temperatures around 100° C. is that the current intensity of the fuel cells is limited, even though a relatively high voltage is realized at these comparatively low temperatures for thermodynamic reasons. Current intensity is a function of hydrogen permeation and, as the operation temperature increases, the hydrogen permeation increases.

The operating temperature, moreover, should lie above the boiling point of water at the respective operating pressure so that the water formed evaporates on the oxygen side and is not deposited as a thin film on the oxygen electrode. Such a film would drastically reduce the performance of the fuel cell.

However, operating pressures above atmospheric pressure are preferred due to the higher conversion realizable. Therefore, it would be desirable to operate fuel cells at correspondingly high temperatures and particularly suitable materials for a solid electrolyte would be those substances which permit operation of a fuel cell under optimized thermodynamic conditions and, thus, with optimally matched thermodynamic parameters. The significant parameters which must be matched to one another are hydrogen permeation, operating temperature and operating pressure.

At the same time, fuel cells should be designed to avoid formation of hot spots to the greatest extent possible.

SUMMARY OF THE INVENTION

It is an object of the present invention to overcome the drawbacks of prior art hydrogen/oxygen fuel cells operating with solid electrolytes. In particular, fuel cells are to be provided which can be employed at operating temperatures well above 100° C. The fuel cells should be substantially resistant to such high temperatures. A high stacking density of fuel cells with high specific power density thus becomes possible and, therefore, the individual fuel cells should be as thin as possible.

These and other objects are accomplished by the present invention which provides a hydrogen/oxygen fuel cell including an electrolyte which is solid at room temperature, has opposing faces, conducts protons, and is comprised of at least one oxide of at least one element selected from the group consisting of Group IVB, VB, VIB, and VIII elements of the Periodic Table, (b) silicon dioxide, and (c) at least one fluoride of at least one element selected from the group consisting of Group IIA and IIIB elements of the Periodic Table; a hydrogen electrode which is applied to one face of the opposing faces of the electrolyte, is hydrogen permeable, and is negatively charged in use; an oxygen electrode which is applied to another face of the opposing faces of the electrolyte, is hydrogen permeable, and is positively charged in use; a hydrogen-containing gas chamber in communication with the hydrogen electrode; and an oxygen-containig gas chamber in communication with the oxygen electrode. The hydrogen/oxygen fuel cell, moreover may include closure means provided along one end of the hydrogen-containing gas chamber for separating same from the oxygen-containing gas chamber, which closure means has defined therein at least one opening provided with valve means for bridging the hydrogen-containing gas chamber and the oxygen-containing gas chamber.

Moreover, the hydrogen electrode and the oxygen electrode may be comprised of at least one metal selected from the group consisting of Group IIIB, IVB, and VB elements of the Periodic Table. The hydrogen electrode and the oxygen electrode may be pore-free foils.

The hydrogen electrode and the oxygen electrode may be each coated with a hydrogen permeable material on the surface thereof which is in communication with the hydrogen-containing gas chamber and the oxygen-containing gas chamber, respectively. The hydrogen permeable material is preferably comprised of nickel or palladium. The oxygen electrode may have an outer layer provided on the surface thereof which is in communication with the oxygen-containing gas chamber, which outer layer may be a layer of silver and porous.

Thus, according to the invention, oxides of elements of the fourth, fifth, sixth and eighth subgroup of the Periodic Table of Elements, i.e., Group IVB, VB, VIB, and VIII elements, are proposed for the proton-conducting solid electrolyte or oxides of silicon. Additionally, fluorides of elements of the second main group or of the third subgroup of the Periodic Table of Elements, i.e., Group IIA or IIIB elements, are proposed for the proton-conducting solid electrolyte. It is also possible to employ mixed oxides or mixed fluorides.

The use of these oxides or fluorides permits the attainment of significantly higher operating temperatures than do organic proton-conductors. Moreover, these electrolyte substances are substantially resistant to high temperatures.

In principle, the capability of these oxides and fluorides to conduct protons is disclosed in Federal Republic of Germany Patent No. 3,008,768 to Baucke et al. (F. G. K. Baucke being a co-inventor of the present invention), which corresponds to U.S. Pat. No. 4,465,339, the disclosure of which is herein incorporated by reference. The subject matter of this Patent lies in a completely different technical field, however. Oxides and fluorides are proposed for the manufacture of an electrochromic mirror, for example, for use as an anti-glare rear-view mirror in motor vehicles, in which these materials are included as an ion-storing layer, e.g., an electrochromic layer, and/or as an ion-conducting layer.

The oxide and fluoride materials of the solid electrolyte in the present fuel cell perform a similar protonconduction function as the materials in such electrochromic mirrors. In the present invention, however, the solid electrolyte conducts protons from a $H_2$ electrode to an $O_2$ electrode applied to opposing faces thereof, and acts as an isolator for electrons. In order to perform this function, the proton-conducting electrolyte may be kept very thin in the fuel cell as well. Electrolyte thicknesses ranging from 0.001 $\mu$m to 15 $\mu$m are useful in the present invention. Preferably the electrolyte thickness ranges from 0.1 $\mu$m to 10 $\mu$m, most preferably from 0.5 to 5 $\mu$m.

Proton-conducting solid electrolytes which melt and become liquid at higher operating temperatures can be employed, however, if they are retained by means of, for example, a thin, stable and porous ceramic matrix. The ceramic matrix retaining means functions to hold the electrolyte in its open, through-going pores. The matrix may be composed of glass or an oxide, such as, for example, $Al_2O_3$, $MgO$, etc.

Known materials such as, for example, palladium or platinum or their alloys can be employed as the electrode material. These electrode materials sufficiently catalyze the reactions occurring thereon. With other electrode materials, however, it may be necessary to increase the catalytic effect. This can be done, for example, by coating the electrodes with suitable catalyst materials which are known in the art.

Advantageously, thin, pore-free films or sheets, such as foils, can be employed as electrodes. Films can be produced, for example, by vapor-deposition. Sheets, such as foils, can be laminated onto the electrolyte (or visa versa) by, for example, mechanical pressing.

For fuel cells to be employed in industry, the electrodes advantageously have a thickness ranging between 10 and 15 $\mu$m, if the hydrogen permeability of the material employed lies at about $10^3$ ($cm^3 H_2/cm^2 \cdot s$) per mm of material thickness. With even thinner films, the hydrogen permeability and, thus, the performance per unit area can be increased even more as confirmed by laboratory tests. Useful electrode thickness range from 0.1 $\mu$m to 50 $\mu$m exclusive of overcoating layer(s). Preferable electrode thicknesses range from 0.1 $\mu$m to 25 $\mu$m, most preferably, from 0.5 $\mu$m to 15 $\mu$m.

Some metals and alloys of metals of the third, fourth and fifth subgroup of the Periodic Table of Elements, i.e., Groups IIIB, IVB, and VB, already exhibit such advantageous hydrogen permeability at relatively low temperatures. Particularly favorable in this respect are the metals titanium and vanadium and their alloys.

Since, due to the selection of inorganic oxides or fluorides as solid electrolytes, the fuel cell according to the present invention can be operated at higher temperatures, the remaining metals or alloys also attain a sufficiently high hydrogen permeability at the corresponding operating temperatures. Thus, the expensive noble metals platinum and palladium can be replaced by less expensive metals.

Further, the present invention renders it unnecessary to employ porous electrodes having a carefully adjusted pore spectrum. The solid electrolyte materials according to the present invention permit higher operating temperatures so that pore-free, film or foil electrodes provide sufficient hydrogen permeability.

Pore-free electrodes additionally provide better separation of the gaseous contents of the hydrogen-containing gas chamber from the gaseous contents of the oxygen-containing gas chamber.

Some metals already exhibit high hydrogen solubility at low temperatures, such as, for example, titanium and niobium, (Ti:$5 \times 10^4$ $cm^3$/100 g). However, the absorption of hydrogen is more difficult at temperatures below 350° C. In such cases, it is helpful to vapor-deposit palladium or nickel onto the previously-cleansed metals in an ultravacuum. Electrodes coated in this way are of advantage also because while palladium and nickel easily absorb hydrogen even at low temperatures, they also simultaneously function as catalysts for the separation of molecular hydrogen into atomic hydrogen.

The metals of the third, fourth and fifth subgroup of the Periodic Table of Elements, i.e., Groups IIIB, IVB, VB, have a great affinity for oxygen. They are therefore preferable as $H_2$ electrode materials.

On the oxygen side, it is necessary to employ a hydrogen permeable material which has a more positive formation enthalpy to hydrogen than to oxygen. In other words, the hydrogen must reduce the oxide of the $O_2$ electrode material so that the $O_2$ electrode is not oxidized by the oxygen. The material must be hydrogen permeable because the combustion reaction takes place at the surface of the $O_2$ electrode.

If metals of the third, fourth or fifth subgroup of the Periodic Table of Elements, i.e., Groups IIIB, IVB, and VB are employed as the $O_2$ electrode, at least one protective layer should be applied on the oxygen gas side of the $O_2$ electrode. The requirements for such a protective layer can be met by the metals palladium and nickel.

Although nickel has a lower hydrogen-permeability than palladium, nickel films or foils can be manufactured very economically. Moreover, the requirement that they be porefree becomes less stringent if the solid electrolyte, protonconductor applied to the $H_2$ electrode or visa versa is a reliable barrier for oxygen.

The same measures must be taken if a gas containing slight quantities of oxygen is employed as the hydrogen-containing gas.

Moreover, a porous silver or silver alloy coating applied to the $O_2$ electrode surface on the gas chamber side is of advantage since silver has an oxygen absorbing effect.

Filter press technology, as well as modified casting technology, can be employed for the assembly of fuel cells from individual electrodes, etc. and fuel cell batteries from individual fuel cells. The materials to be employed are selected based o the desired operating conditions. For example, the electrodes may be held together by means of insulating, high temperature-resistant, metal-ceramic joints between which the electrolyte is disposed. In addition to mechanical deformation processes, the thin electrode and electrolyte layers can also be produced galvanically and electrophoretically. For laboratory test purposes, the electrodes and electrolyte layer were produced by vapordeposition, which can be performed by various methods. The layers employed, which had a thickness of 0.5-12.5 $\mu$m, proved to be free of pores.

A film or sheet (foil) electrode fuel cell including a proton conducting solid electrolyte has the additional advantage that it is possible to vary the power of the fuel cell by changing the operating temperature and the hydrogen gas pressure in the hydrogen gas chamber. An increase in the pressure of the hydrogen gas or hydrogen-containing gas in the gas chamber also increases the hydrogen permeation through the electrodes and, thus, results in an increase in performance. An increase in temperature has the same results. These parameters, temperature and pressure, moreover, can be varied simultaneously or individually.

For operation, the fuel cell must be brought to the operating temperature. This can be done, for example, by electric heating. However, a current supply required for this purpose may be omitted if the fuel cell is heated by direct combustion of the hydrogen.

DESCRIPTION OF THE PREFERRED EMBODIMENTS

Figure 1:
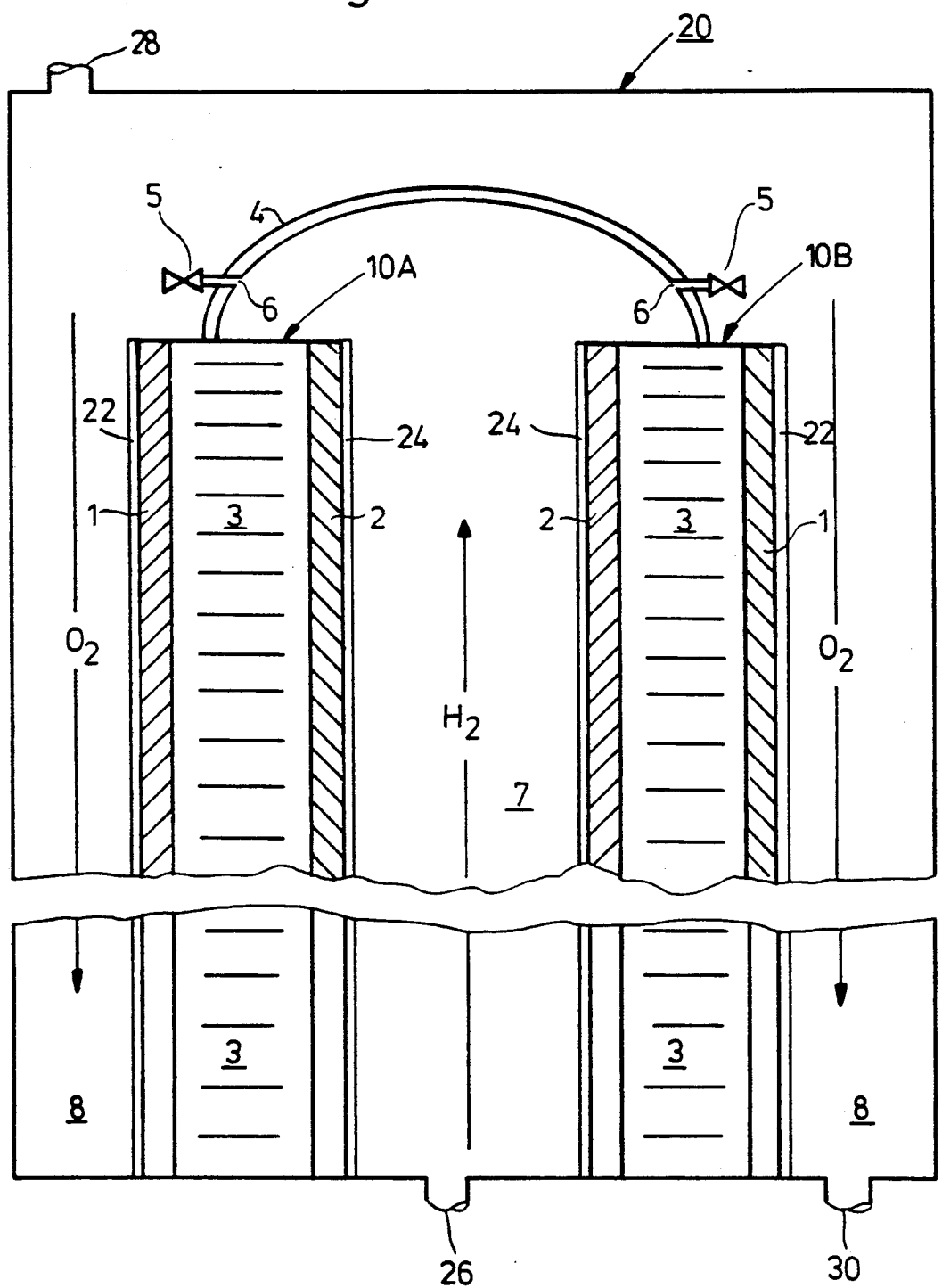
FIG. 1 is a schematic, cross-sectional plan view of a fuel cell battery assembly including two fuel cells according to the invention.

FIG. 1 is a cross-sectional plan view of a schematic representation of a fuel cell battery assembly 20 including two fuel cells 10A and 10B. Each fuel cell 10A, 10B includes an $O_2$ electrode 1, a $H_2$ electrode 2, and an electrolyte 3 which is solid at room temperature.

Each $O_2$ electrode 1 is shown as being provided with an outer layer 22, which is a coating 22 and which may be made of at least one protective material and/or may be made of a material, such as an oxygen-absorbing material, capable of catalyzing the desired chemical reaction(s), particularly the combustion of hydrogen, which takes place at the surface of oxygen electrode 1 in contact with the oxygen-containing gas stream flowing through oxygen-containing gas chamber 8. Each $H_2$ electrode 2 is shown as being provided with a coating 24, which may be made of a material, such as a hydrogen-absorbing material, capable of catalyzing the separation of molecular hydrogen ($H_2$) into ionic hydrogen ($H^+$).

In use, a hydrogen-containing gas stream flows into hydrogen-containing gas chamber 7 through hydrogen inlet 26. Hydrogen-containing gas chamber 7 is closed at one end by closure means 4, shown as closure device 4. This encourages hydrogen in the form of protons to travel through the respective fuel cells 10A, 10B to an oxygen-containing gas chamber 8 through which an oxygen-containing gas stream flows. Oxygen-containing gas chamber 8 has inlet 28 and outlet 30.

Closure device 4 may have defined therein one or more openings 6 which can be closed, for example, by valve means 5, shown as needle valve 5, and through which the hydrogen-containing gas chamber 7 may be connected with the oxygen-containing gas chamber 8. If the hydrogen-containing gas stream is introduced under pressure, it travels through openings 6 into the oxygen-containing gas chamber 8 under non-explosive conditions and is ignited upon contact with a catalyst layer 22 coated onto the $O_2$ electrode.

In this way, the assembly can be heated to operating temperature. Another advantage of this arrangement is that impurities accumulating in the oxygen-containing gas chamber 8 are removed, possibly as products of combustion, and are discharged together with the oxygen-containing gas stream.

EXAMPLE

Figure 2:
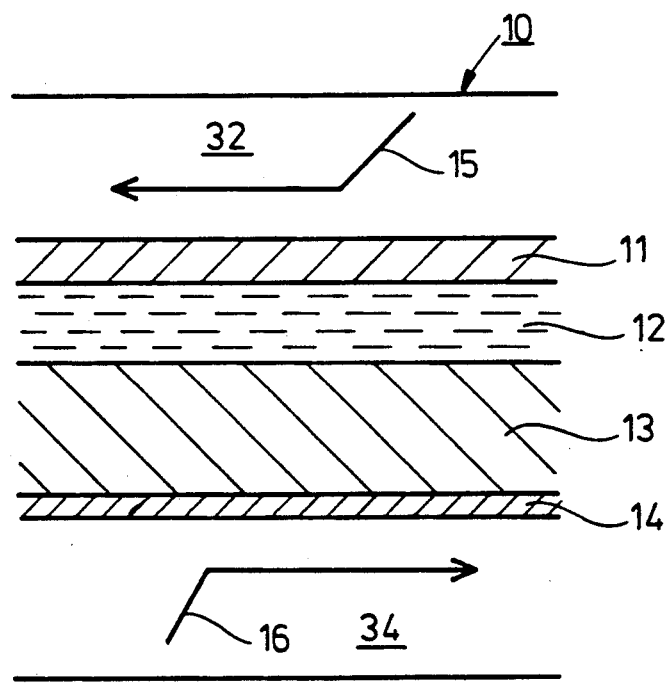
FIG. 2 is a schematic, cross-sectional plan view of a preferred embodiment of a fuel cell according to the invention.

FIG. 2 shows a preferred embodiment of a fuel cell 10 according to the invention.

An oxygen-containing gas stream 15 was employed which was composed of 20% $O_2$ and 80% $N_2$, and was caused to flow through oxygen-containing gas chamber 32 past $O_2$ electrode 11. A hydrogen-containing gas stream 16 was employed which was composed of 20% $H_2$ and 80% $N_2$, and was caused to flow through hydrogen-containing gas chamber 34 past $H_2$ electrode 13. The pressure in each case was 1 bar (absolute).

Oxygen electrode 11 was composed of a nickel layer having a thickness of 0.5 μm. It was in contact with solid electrolyte 12 composed of a $Ta_2O_5$ layer 0.5 μm thick. Hydrogen electrode 13 was composed of a 12.5 μm thick nickel layer 13. Hydrogen electrode 13 was covered on the gas side by a palladium layer 14 having a thickness of several atom layers.

The fuel cell had a diameter of 80 mm and furnished the following voltages at the temperatures listed:

70° C.:0.97 V,
120° C.:0.88 V, and
140° C.:0.81 V.

It will be understood that the above description of the present invention is susceptible to various modifications, changes and adaptations, and the same are intended to be comprehended within the meaning and range of equivalents of the appended claims.

What is claimed is:

1. A hydrogen/oxygen fuel cell, comprising:
    an electrolyte which is solid at room temperature, has opposing faces, conducts protons, and is comprised of at least one of (a) at least one oxide of at least one element selected from the group consisting of Group IVB, VB, VIB, and VIII elements of the Periodic Table, (b) silicon dioxide, and (c) at least one fluoride of at least one element selected from the group consisting of Group IIA and IIIB elements of the Periodic Table;
    a hydrogen electrode which is applied to one face of the opposing faces of the electrolyte, is hydrogen permeable, and is negatively charged in use;
    an oxygen electrode which is applied to another face of the opposing faces of the electrolyte, is hydrogen permeable, and is positively charged in use;
    a hydrogen-containing gas chamber in communication with the hydrogen electrode; and
    an oxygen-containing gas chamber in communication with the oxygen electrode.

2. The hydrogen/oxygen fuel cell according to claim 1, wherein the hydrogen electrode and the oxygen electrode are comprised of at least one metal selected from the group consisting of Group IIIB, IVB, and VB elements of the Periodic Table.

3. The hydrogen/oxygen fuel cell according to claim 2, wherein the hydrogen electrode and the oxygen electrode are each coated with a hydrogen permeable material on the surface thereof which is in communication with the hydrogen-containing gas chamber and the oxygen-containing gas chamber, respectively.

4. The hydrogen/oxygen fuel cell according to claim 3, wherein the hydrogen permeable material is comprised of nickel or palladium.

5. The hydrogen/oxygen fuel cell according to claim 1, wherein the oxygen electrode has an outer layer provided on the surface thereof which is in communication with the oxygen-containing gas chamber, which outer layer is a layer of silver and is porous.

6. The hydrogen/oxygen fuel cell according to claim 1, wherein the hydrogen electrode and the oxygen electrode are pore-free foils.

7. The hydrogen/oxygen fuel cell according to claim 1, further comprising closure means provided along one end of the hydrogen-containing gas chamber for separating same from the oxygen-containing gas chamber, which closure means has defined therein at least one opening provided with valve means for bridging the hydrogen-containing gas chamber and the oxygen-containing gas chamber.

* * * * *